June 3, 1952          C. S. ASH          2,598,876

DRIVEN WHEEL ASSEMBLY, INCLUDING HYDRAULIC TRANSMISSION MEANS

Filed July 1, 1947          4 Sheets-Sheet 1

INVENTOR.
Charles S. Ash
BY
Morgan, Finnegan & Durham
ATTORNEYS.

INVENTOR.
Charles S. Ash
BY Morgan, Finnegan & Durham
ATTORNEYS

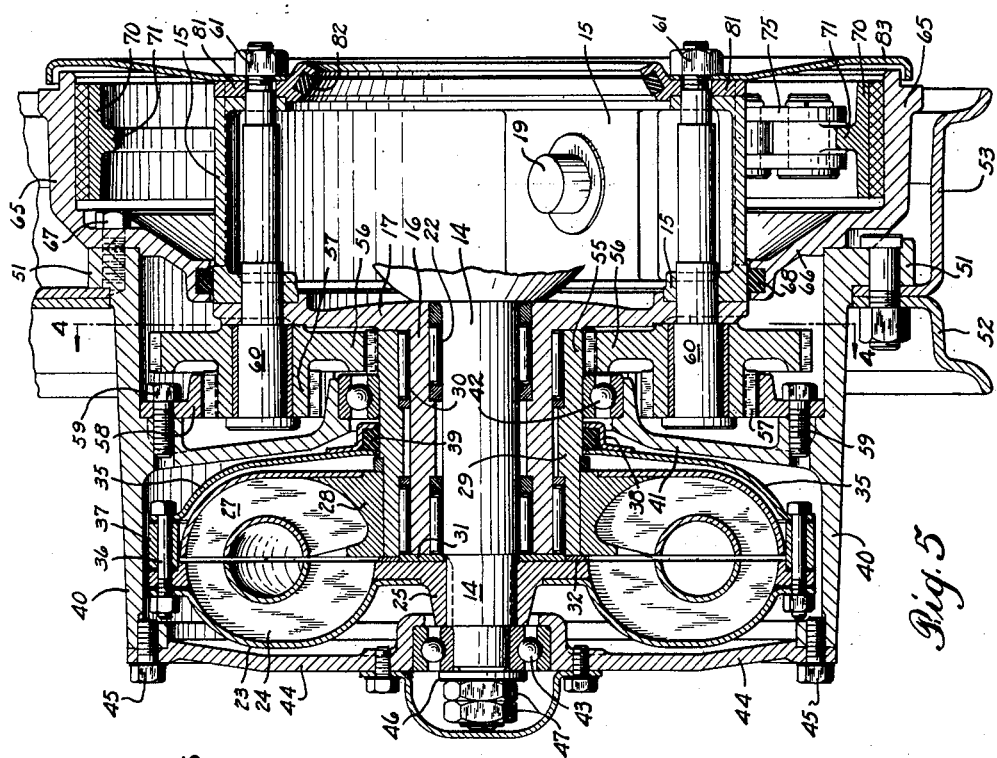
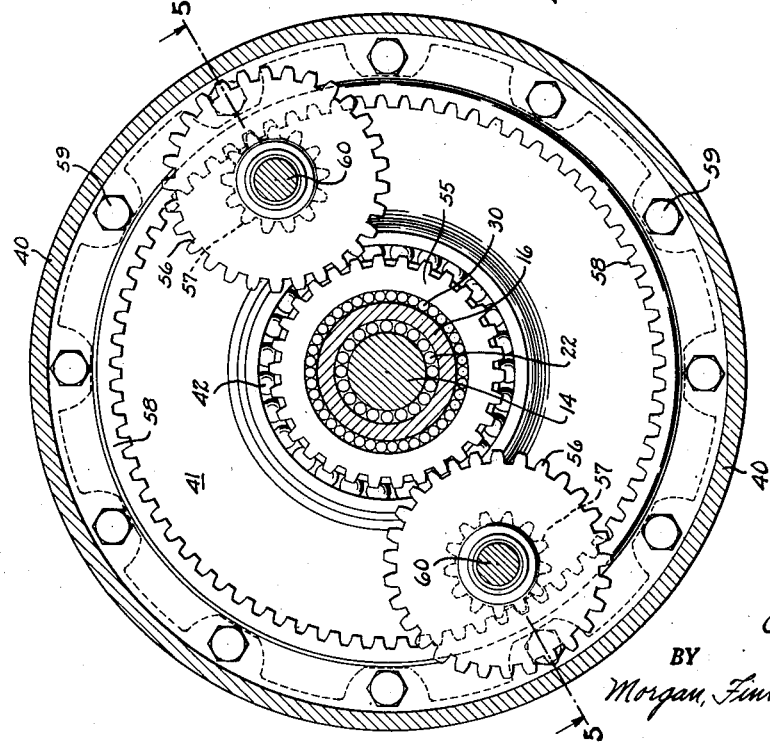

June 3, 1952 C. S. ASH 2,598,876
DRIVEN WHEEL ASSEMBLY, INCLUDING HYDRAULIC TRANSMISSION MEANS
Filed July 1, 1947 4 Sheets-Sheet 4

INVENTOR.
Charles S. Ash
BY
Morgan, Finnegan & Durham
ATTORNEYS.

Patented June 3, 1952

2,598,876

UNITED STATES PATENT OFFICE 2,598,876

DRIVEN WHEEL ASSEMBLY, INCLUDING HYDRAULIC TRANSMISSION MEANS

Charles S. Ash, Milford, Mich.

Application July 1, 1947, Serial No. 758,347

12 Claims. (Cl. 180—43)

The present invention relates to an improved hydraulically driven vehicle wheel structure.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 4 is a transverse cross-sectional view taken along line 4—4 of Fig. 5;

Fig. 5 is a longitudinal cross-sectional view taken along line 5—5 of Fig. 6, certain parts being broken away for greater clarity;

Figure 1:
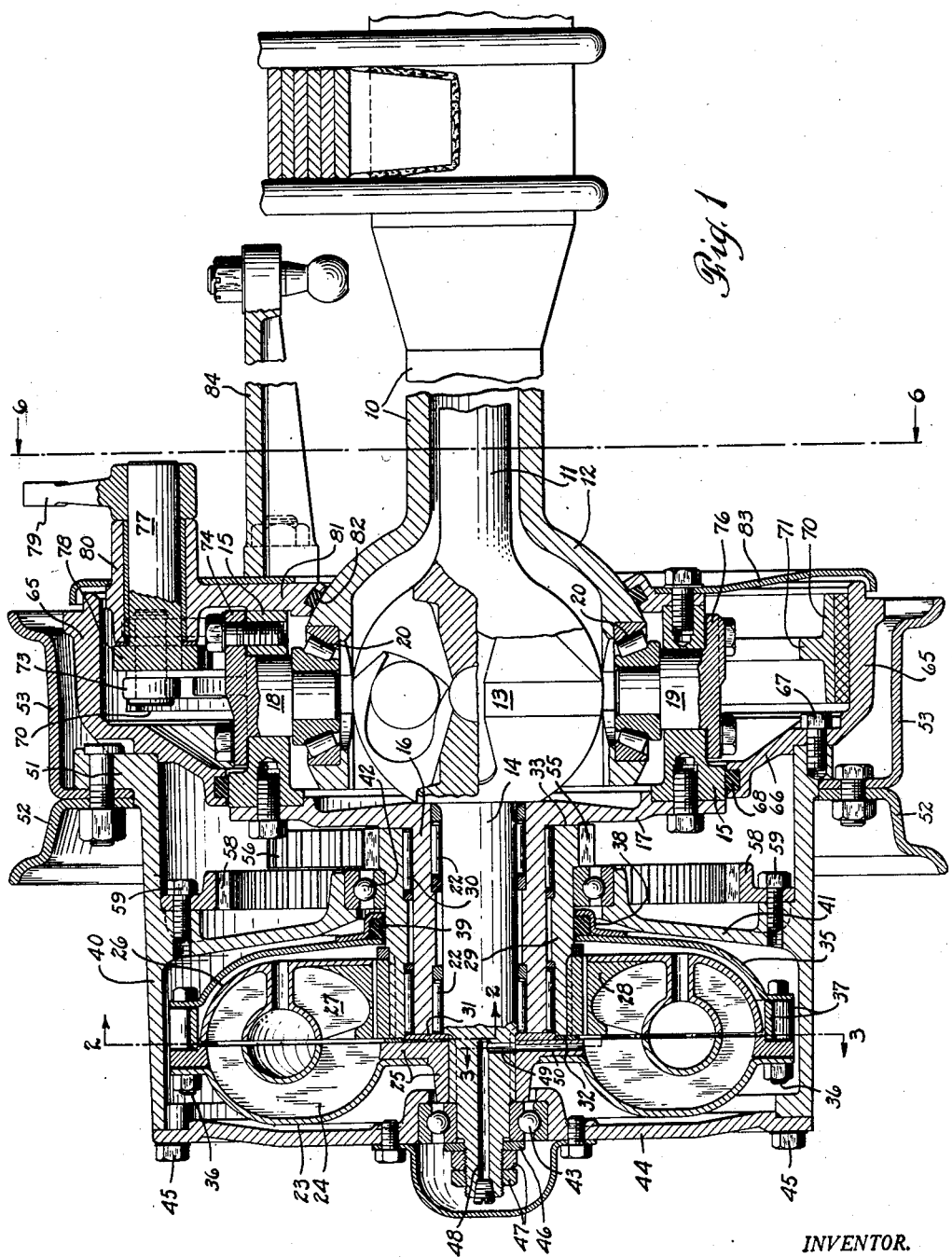
Fig. 1 is a longitudinal cross-sectional view of a driven, dirigible wheel assembly embodying the present invention taken along line 1—1 of Fig. 6.
Figure 2:
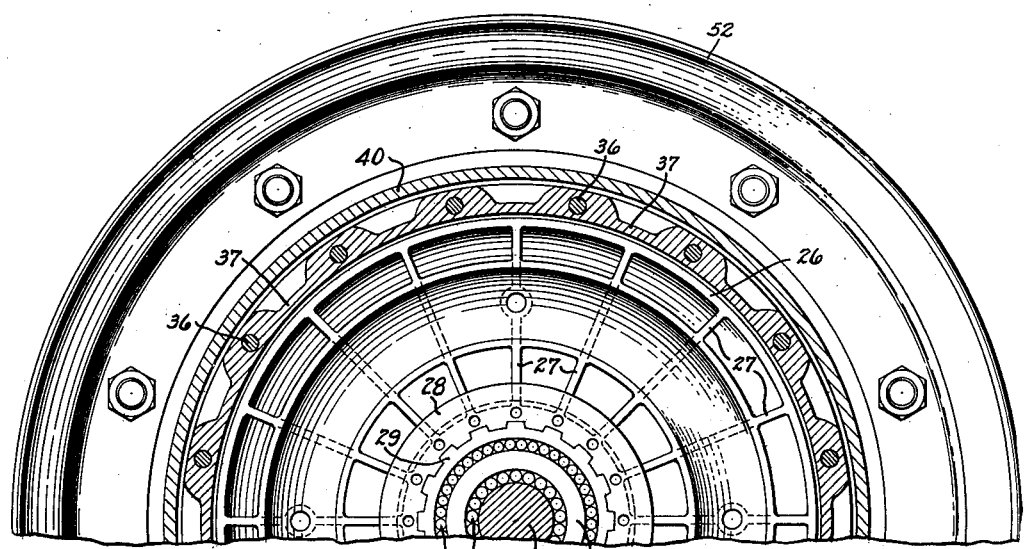
Fig. 2 is a transverse cross-sectional view taken along line 2—2 of Fig. 1.
Figure 3:
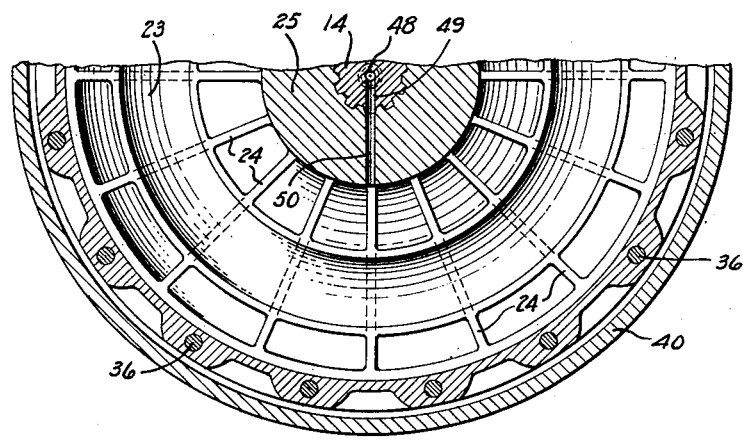
Fig. 3 is a transverse cross-sectional view taken along line 3—3 of Fig. 1.

The present invention has for an object the provision of an improved hydraulically driven vehicle wheel structure. The invention further provides such a structure which is adapted for use at the front or steering end of a vehicle, and is equipped with suitable braking means. Still another object of the invention is the provision of a strong, well balanced and compact driven wheel assembly in which hydraulic driving or drive transmission means are provided at the wheel of the vehicle, whereby conventional differential and other gearing mechanisms may be omitted in the vehicle. The invention further provides a vehicle wheel assembly of the type just mentioned wherein the speed reduction gearing between the vehicle drive shaft and wheel is located at the wheel and between the wheel and a runner member of an hydraulic power transmission, which further permits the elimination of conventional gearing mechanism in other parts of the vehicle and a more efficient operation in the hydraulic power transmitter since the impeller member thereof is adapted to operate at drive shaft speeds. Still another object of the invention is the provision of a compact, efficient and sturdy speed reduction gearing in a wheel assembly such as that just mentioned.

Referring now in detail to the illustrative embodiment of the invention shown by way of example in the accompanying drawings, the vehicle wheel assembly is shown as mounted at the end of a tubular vehicle axle 10 within which is mounted the drive shaft 11 which is driven by the vehicle power means (not shown). The end of axle 10 is parti-spherically formed as indicated at 12 to enclose any conventional and suitable universal joint 13, here shown as a Marmon-Herrington construction, through which a dirigible spindle 14 is driven from the shaft 11. An annular casting 15 is positioned to surround the portion 12 at the end of axle 10, and is adapted to carry certain of the braking and steering mechanism for the wheel assembly, as hereinafter described, as well as a hollow spindle 16 mounted thereon by an integral flange portion 17 bolted to the casting as shown. Upper and lower king pin members 18 and 19 respectively are positioned in suitable apertures in casting 15, are bolted thereto, and extend radially inwardly through the casting to be mounted by roller bearings 20 in suitable apertures in the parti-spherical end portion 12 of the axle, whereby casting 15 and tubular spindle 16 are mounted for dirigible movement upon the end of the axle 10.

As shown, the hydraulic driving or drive transmission means for the vehicle wheel is mounted adjacent the outer end of the driven spindle 14, which is rotatably mounted within hollow spindle 16 by means of needle bearings 22. Said hydraulic driving means comprise an impeller member 23, having a plurality of radially extending vanes 24, which is carried by an annular base 25 having a splined connection on the reduced end of spindle 14, whereby the impeller is driven from the spindle. The runner member 26 with radially extending vanes 27 is mounted with its open side facing and adjacent to impeller 23, and is secured to an annular base portion 28 which has a splined connection with a sleeve member 29 which is mounted for rotation on the hollow spindle 16 by means of needle bearings 30. Annular thrust washers 31 and 32 are positioned between the base portion of impeller 23 and the end of hollow spindle and the outer ends of spindle 16, sleeve 29 and the base portion of runner 26. The axial thrust at the other end of sleeve 29 takes place against a finished surface 33 of flange 17.

The fluid chamber for receiving oil or other suitable fluid whereby runner 26 may be driven from the impeller 23 is completed by an annular curved cover member 35 spaced from the curved solid back wall of runner 26 and secured to the impeller 23 for rotation therewith by a plurality of bolts 36, an annular spacing ring 37 being interposed between the impeller and cover. A channel is provided at the inner periphery of cover 35 by a welded on channel member 38 and a sealing ring 39 is positioned therein to contact an external surface of sleeve 29 to seal at that place the fluid chamber formed by impeller 23 and cover 35 enclosing the runner 26.

The wheel construction for the herein disclosed embodiment of the invention includes an axially extending, cylindrical portion 40 formed integrally with a radially extending web portion 41, the elements being parts of the same wheel casting. The wheel members as described are rotatably mounted by an anti-friction bearing 42 between the inner periphery of web portion 41 and the sleeve 29, and also by anti-friction bearing 43 positioned on the outer reduced end of driven spindle 14 and rotatably supporting a removable flange or web portion 44 which is secured at its outer periphery to the end of cylindrical wheel portion 40 by means of bolts 45. The wheel, bearing and hydraulic power transmission elements described are held in assembled position at the outer end of the assembly by a washer 46 and nuts 47 on the end of spindle 14. Means for conveniently filling the fluid chamber described are provided in the form of axial and radial passages 48 and 49 respectively in spindle 14 and establishing communication between the outer end thereof and a filling channel 50 in the base portion 25 of impeller 23. The cylindrical portion 40 of the wheel is provided at its inner end with a plurality of radially extending bosses 51 serving as attaching members for the removable rim elements 52 and 53 adapted to removably mount a pneumatic tire on the wheel.

Speed reduction gearing for the driven wheel assembly of the present invention is conveniently and compactly positioned within the cylindrical wheel portion 40 and axially inwardly of the hydraulic power transmission mechanism. As shown, such means comprise an externally toothed gear portion 55 formed integrally at the inner end of sleeve 29, and meshing with the portion 56 of a compound spur pinion gear 56—57, the portion 57 of which meshes with the internally toothed ring gear 58 secured to the wheel web portion 41 by bolts 59 for rotation therewith. As best shown in Fig. 5 of the drawings, each of the two compound gears 56—57 is mounted on a shaft 60 which extends through suitable apertures in the flange portion 17 of spindle 16 and casting 15 and is firmly secured thereto by nuts 61.

With the construction shown and described it will be appreciated that the wheel drive in the assembly of the present invention takes place from the vehicle power means to the axle 11, through universal 13 to spindle 14, from impeller 23 through the hydraulic fluid to runner 26, thence through spindle 29 to the wheel portion 40 through the reduction gearing 55, 56—57, and 58. In such a structure the hydraulic power transmission means serves the purpose, in a superior manner, of the conventional differential gearing provided for driven wheel assemblies and such gearing may accordingly be omitted. Gear reduction means are provided at the individual wheel assembly so that greater efficiency is realized in the hydraulic power transmission system, the impeller thereof being normally operated at a relatively high rate of speed, and the entire driven wheel assembly is compact, sturdy, efficient and well balanced.

Braking means for the wheel assembly of the present invention are provided and are similar in operating principle to the means disclosed in my copending application Serial No. 559,504 filed October 20, 1944, now Patent No. 2,512,049. Said braking means comprise a cylindrical drum portion 65 having an integral attaching flange 66 seated against the peripheral flange 51 of the wheel and secured thereto by bolts 67. The drum attaching flange 66 extends further radially inwardly and the inner periphery thereof is channeled to receive a sealing ring 68 which engages an exterior surface of casting 15 in order to seal off the speed reduction gearing from the brake mechanism.

Figure 6:
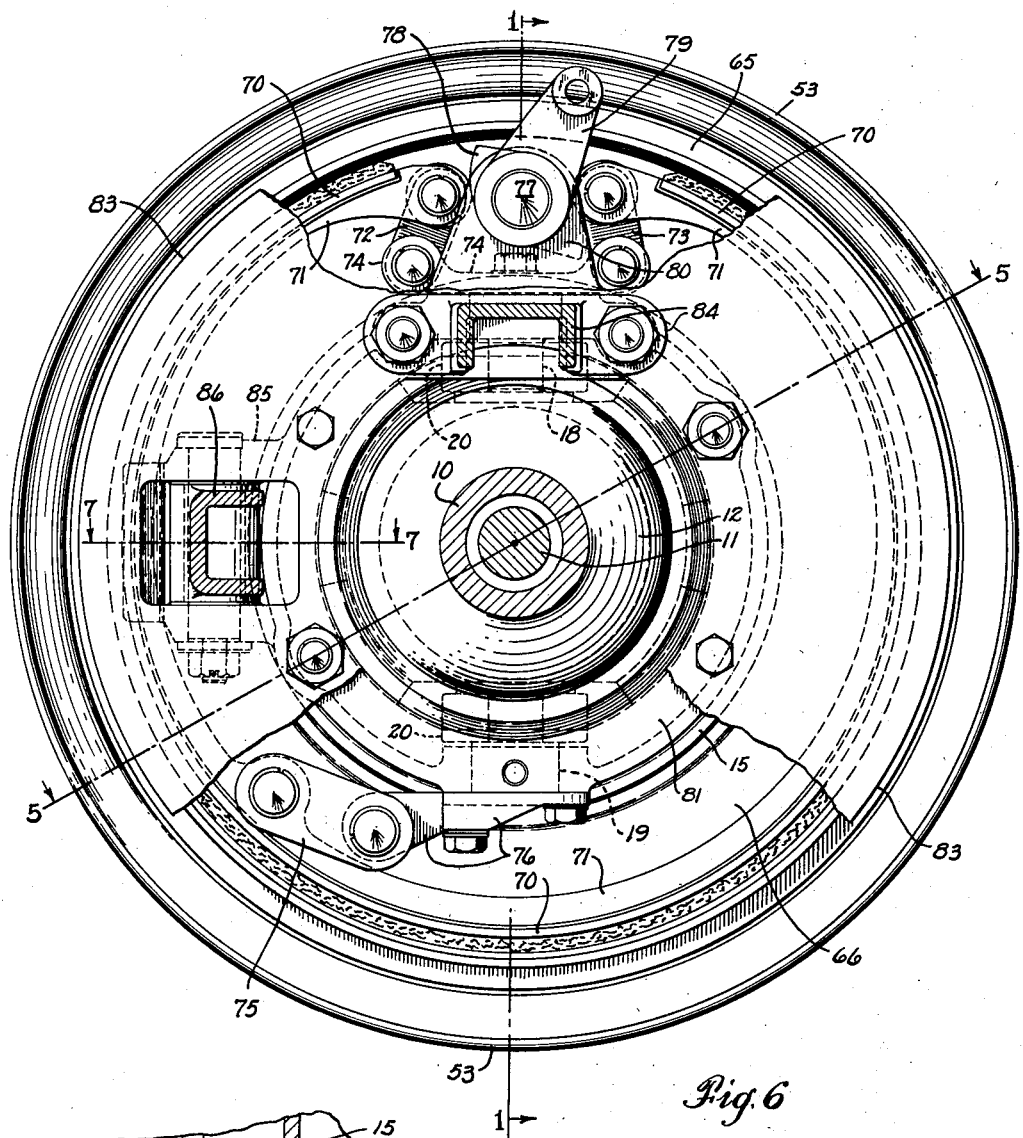
Fig. 6 is a view of the wheel assembly partly in elevation and partly in cross section taken along line 6—6 of Fig. 1.

The means for frictionally retarding rotation of drum 65 include a brake shoe 70 (Fig. 6) within the drum having an eccentric central rib 71 for uniform expansion. Adjacent ends of the shoe 70 are mounted by means of links 72 and 73 upon an upper hanger 74 which is formed integrally with king pin member 18 hereinbefore described. Shoe 70 is further pivotally supported about two thirds of its total extent from link 73 by means of a link 75 which pivotally interconnects the rib 71 of the shoe and a lower hanger 76 which is formed integrally with the lower king pin member 19.

Figure 7:
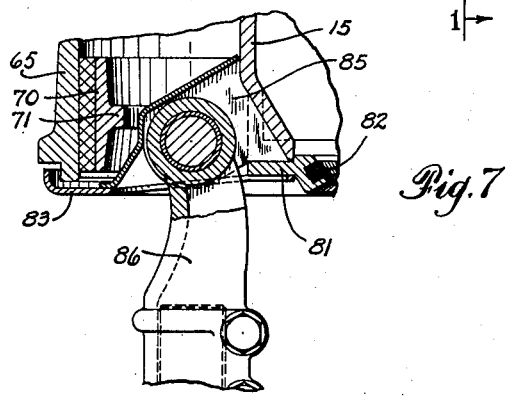
Fig. 7 is a detail cross-sectional view taken along line 7—7 of Fig. 6.

The brake actuating means comprise a shaft 77 carrying cam member 78 arranged to contact the brake shoe ends to expand the shoe upon rotation of the shaft by arm 79 from any conventional and suitable mechanism (not shown). The shaft 77 is journalled in an enlarged upper boss portion 80 of a ring member 81 which is bolted to casting 15. The ring carries a sealing ring 82 to contact the parti-spherical axle end 12 to suitably seal the universal joint and king pin mechanism, and a protection plate 83 may also be secured to casting 15 to enclose the inner end of the brake mechanism. A suitable steering arm 84 is secured to a forward portion of casting 15, and a rear portion thereof is formed with a box-like extension 85 to which may be pivotally connected a suitable tie rod 86, as shown in detail in Figs. 6 and 7 of the drawings. Sturdy and efficient internally expanding servo braking means are thus provided in the driven dirigible wheel assembly herein described.

The invention in its broader aspects is not limited to the specific mechanisms shown and described but departures may be made therefrom, within the scope of the accompanying claims, without departing from the principles of the invention and without sacrificing its chief advantages.

What I claim is:

1. A wheel assembly for an automotive vehicle comprising, in combination, a rotatably mounted wheel having a radially extending supporting element, a shaft driven from the vehicle power means, hydraulic power transmission means connected to said shaft, and gearing means interconnecting said transmission means and wheel, said transmission and gearing means being positioned on opposite sides of said supporting element.

2. A wheel assembly for an automotive vehicle comprising, in combination, a rotatably mounted wheel having a radially extending supporting element, a shaft driven from the vehicle power means, hydraulic power transmission means connected to said shaft positioned axially outwardly of said supporting element, and speed reduction gearing interconnecting said transmission means and wheel and positioned axially inwardly of said supporting element.

3. A wheel assembly for an automotive vehicle comprising, in combination, a dirigibly and rotatably mounted wheel having a tire rim and a pair of axially spaced radially extending supporting elements, a king pin surrounded by said rim, a spindle pivoted about said king pin and driven from the vehicle power means, and hydraulic power transmission means interconnecting said spindle and wheel and positioned between said supporting elements.

4. A wheel assembly for an automotive vehicle comprising, in combination, a rotatably mounted wheel having a pair of axially spaced radially extending supporting elements, a shaft driven from the vehicle power means, hydraulic power transmission means connected to said shaft and positioned between said supporting elements, and speed reduction gearing interconnecting said transmission means and wheel and positioned axially inwardly of the axially inner of said supporting elements.

5. A wheel assembly for an automotive vehicle comprising, in combination, a rotatably and dirigibly mounted wheel having a tire rim and a radially extending supporting element, a king pin surrounded by said rim, a spindle pivoted about said king pin and driven from the vehicle power means, hydraulic power transmission means interconnecting said spindle and wheel and positioned axially outwardly of said supporting element, braking means for said wheel surrounding said king pin and positioned axially inwardly of said supporting element and gearing means interconnecting said spindle and wheel and positioned axially inwardly of said supporting element.

6. A wheel assembly for an automotive vehicle comprising in combination, a rotatably mounted wheel having a radially extending supporting element, a shaft driven from the vehicle power means, hydraulic power transmission means connected to said shaft positioned axially outwardly of said supporting element, speed reduction gearing interconnecting said transmission means and wheel and positioned axially inwardly of said supporting element and braking means for said wheel positioned axially inwardly of said speed reduction gearing.

7. A wheel assembly for an automotive vehicle comprising, in combination, a dirigibly and rotatably mounted wheel having a tire rim and a pair of axially spaced radially extending supporting elements, a king pin surrounded by said rim, a spindle pivoted about said king pin and driven from the vehicle power means, hydraulic power transmission means interconnecting said spindle and wheel and positioned between said supporting elements and braking means for said wheel surrounding said king pin and positioned axially inwardly of the axially inner of said supporting elements.

8. A wheel assembly for an automotive vehicle comprising, in combination, a rotatably mounted wheel having a pair of axially spaced radially extending supporting elements, a shaft driven from the vehicle power means, hydraulic power transmission means connected to said shaft and positioned between said supporting elements, speed reduction gearing interconnecting said transmission means and wheel and positioned axially inwardly of the axially inner of said supporting elements and braking means for said wheel positioned axially inwardly of said transmission means.

9. A driven dirigible wheel assembly for an automotive vehicle comprising, in combination, a rotatably and dirigibly mounted wheel having a radially extending supporting element, a pivotally mounted spindle, hydraulic power transmission means interconnecting said spindle and wheel and positioned axially outwardly of said supporting element, a universal joint interconnecting said spindle and the vehicle power means and positioned axially inwardly of said supporting element, and gearing means interconnecting said spindle and wheel and positioned between said supporting element and universal joint.

10. A driven dirigible wheel assembly for an automotive vehicle comprising, in combination, a rotatably and dirigibly mounted wheel having a radially extending supporting element, a pivotally mounted spindle, hydraulic power transmission means connected to said spindle and positioned axially outwardly of said supporting element, speed reduction gearing interconnecting said transmission means and wheel and positioned axially inwardly of said supporting element, and a universal joint interconnecting said spindle and the vehicle power means and positioned axially inwardly of said reduction gearing.

11. A driven dirigible wheel assembly for an automotive vehicle comprising, in combination, a rotatably and dirigibly mounted wheel having a radially extending supporting element, a pivotally mounted spindle, hydraulic power transmission means interconnecting said spindle and wheel and positioned axially outwardly of said supporting element, a universal joint interconnecting said spindle and the vehicle power means and positioned axially inwardly of said supporting element, braking means for said wheel including brake drum and shoe members encircling said universal joint, and gearing means interconnecting said spindle and wheel and positioned between said supporting element and universal joint.

12. A driven wheel assembly for an automotive vehicle comprising, in combination, a hollow spindle, a driven spindle in said hollow spindle driven by the vehicle power means, a sleeve rotatably mounted on said hollow spindle, hydraulic power transmission means having an impeller element connected to said driven spindle and a runner element connected to said sleeve, a wheel having a pair of radially extending supporting elements rotatably mounted on said driven spindle and sleeve respectively and positioned at either side axially of said power transmission means, and speed reduction gearing interconnecting said sleeve and wheel.

CHARLES S. ASH.

REFERENCES CITED

The following references are of record in the file of this patent:

UNITED STATES PATENTS

| Number | Name | Date |
|---|---|---|
| 1,349,249 | Alden | Aug. 10, 1920 |
| 1,797,578 | Hoffman | Mar. 24, 1931 |
| 1,919,925 | Blakeslee | July 25, 1933 |
| 2,075,563 | Alden | Mar. 30, 1937 |
| 2,221,705 | Glynn, Jr. | Nov. 12, 1940 |
| 2,281,541 | Ash | May 5, 1942 |
| 2,287,498 | Scofield | June 23, 1942 |
| 2,294,994 | Maze | Sept. 8, 1942 |
| 2,310,513 | Burns | Feb. 9, 1943 |
| 2,335,544 | Schnetzer | Nov. 30, 1943 |
| 2,409,196 | Cunningham | Oct. 15, 1946 |

FOREIGN PATENTS

| Number | Country | Date |
|---|---|---|
| 479,722 | France | May 3, 1916 |